(12) United States Patent
Dudar

(10) Patent No.: US 10,464,412 B2
(45) Date of Patent: Nov. 5, 2019

(54) METHODS AND SYSTEM FOR DIAGNOSING A POSITION OF ACTIVE GRILLE SHUTTERS OF A VEHICLE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 15/626,920

(22) Filed: Jun. 19, 2017

(65) Prior Publication Data

US 2018/0361846 A1 Dec. 20, 2018

(51) Int. Cl.
*B60K 11/08* (2006.01)
*B60R 19/52* (2006.01)

(52) U.S. Cl.
CPC .............. *B60K 11/085* (2013.01); *B60R 19/52* (2013.01); *B60R 2019/525* (2013.01)

(58) Field of Classification Search
CPC .................................................. B60K 11/085
See application file for complete search history.

(56) References Cited

U.S. PATENT DOCUMENTS

| | | | |
|---|---|---|---|
| 3,675,023 A | 7/1972 | Kunke et al. | |
| 5,142,133 A | 8/1992 | Kern et al. | |
| 5,453,662 A | 9/1995 | Gottlieb | |
| 5,708,414 A | 1/1998 | Peltier et al. | |
| 6,297,740 B1 | 10/2001 | Hill et al. | |
| 6,396,040 B1* | 5/2002 | Hill ....................... | B60Q 1/1423 250/205 |
| 9,580,071 B2* | 2/2017 | Asami .................... | B60W 20/50 |
| 9,744,846 B2* | 8/2017 | Schmidt ................. | B60K 11/04 |
| 9,828,036 B2* | 11/2017 | Frayer .................. | B62D 25/082 |
| 9,868,347 B2* | 1/2018 | Boom ................... | B60K 11/085 |
| 9,878,609 B2* | 1/2018 | Dudar ................... | B60K 11/085 |
| 9,975,421 B2* | 5/2018 | Froling .................. | B60K 11/04 |
| 10,011,165 B2* | 7/2018 | Dudar ................ | B60H 1/00657 |
| 10,017,046 B2* | 7/2018 | Thullier ................ | B60K 11/085 |
| 2008/0250735 A1* | 10/2008 | Patterson .............. | E04D 13/033 52/200 |
| 2012/0100790 A1 | 4/2012 | Miesterfeld et al. | |
| 2012/0270490 A1 | 10/2012 | Turner et al. | |
| 2013/0247862 A1* | 9/2013 | Sakai .................... | B60K 11/085 123/188.1 |
| 2013/0338870 A1* | 12/2013 | Farmer ................. | B60K 11/085 701/29.2 |
| 2014/0165483 A1* | 6/2014 | Tandler ................. | E04D 13/033 52/200 |
| 2016/0040634 A1* | 2/2016 | Haight ............... | B01D 46/0083 95/26 |

(Continued)

*Primary Examiner* — Katy M Ebner
(74) *Attorney, Agent, or Firm* — Geoffrey Brumbaugh; McCoy Russell LLP

(57) ABSTRACT

Methods and systems are provided for determining a position of active grille shutters (AGS) using a light sensor positioned behind the AGS. In one example, a method may include diagnosing a position of the AGS in response to an output of a light sensor positioned behind the active grille shutters (AGS), and responsive to the diagnosed position, adjusting an engine operating parameter. Further, the AGS diagnostic may be performed in response to an indication of ambient light external to a vehicle being over a threshold level.

19 Claims, 5 Drawing Sheets

(56) References Cited

U.S. PATENT DOCUMENTS

| | | | | |
|---|---|---|---|---|
| 2016/0186488 A1* | 6/2016 | Gardiner | ............... | E06B 9/264 |
| | | | | 160/1 |
| 2016/0311313 A1* | 10/2016 | Hori | ..................... | G05D 3/12 |
| 2018/0163863 A1* | 6/2018 | Ogawa | ............ | F16H 61/66259 |
| 2018/0229679 A1* | 8/2018 | Yasui | .................. | B60R 19/52 |
| 2018/0361846 A1* | 12/2018 | Dudar | ............... | B60K 11/085 |
| 2019/0026961 A1* | 1/2019 | Dudar | ............... | B60K 11/085 |
| 2019/0077298 A1* | 3/2019 | Dill | .................. | B60Q 1/0011 |

* cited by examiner

METHODS AND SYSTEM FOR DIAGNOSING A POSITION OF ACTIVE GRILLE SHUTTERS OF A VEHICLE

FIELD

The present description relates generally to methods and systems for diagnosing an active grille shutter system of a vehicle using a light sensor.

BACKGROUND/SUMMARY

Active grille shutters (AGS) may be incorporated into vehicles in order to help meet increasingly strict fuel economy standards. Active grille shutters (AGS) are typically located proximate to a front grille of a vehicle, and may be selectively adjusted in order to increase or decrease the amount of fresh air entering an underhood area of the vehicle through the grille. AGS may be closed and remain closed when starting a cold engine to reduce cool air transfer from outside the engine compartment and therefore increase engine temperatures more quickly to reduce vehicle emissions and fuel consumption. At elevated engine temperatures, the grille shutters may be opened in order to increase the amount of cool air entering the engine compartment, thereby increasing engine cooling. At higher vehicle speeds, active grill shutters may automatically close to block airflow through the engine cooling system when supplemental cooling is not beneficial, thereby reducing vehicle drag and fuel consumption. In some AGS systems, the AGS may be controlled using position feedback sensors coupled to the grille shutters.

Because of the impact that the AGS system has on engine cooling, and consequently engine performance, exhaust emissions, and efficiency, a robust diagnostic for readily identifying potential degradation in the AGS system is desired. Numerous degradation modes are possible for an AGS system. In one example, the AGS may be stuck in a fixed position, rendering the grille shutters unable to be automatically adjusted responsive to engine operating conditions. In other examples, the mechanical linkages between the AGS grilles and the AGS motor may be damaged, or the AGS position sensor or the motor itself may be degraded. Other attempts to address diagnosing degradation of the AGS system include monitoring engine temperature response as the position of the active grille shutters are adjusted. One example approach is shown by Farmer et al. in U.S. Patent Application Publication 2013/0338870. Therein, Farmers describes a method for performing an extended diagnostic of an AGS system responsive to monitoring for a mechanical fault condition signal (e.g., mechanically broken or stuck AGS) and an indication that a temperature proximate the grille shutters is outside a threshold.

The inventors herein have recognized potential issues with such systems. Namely, such systems fail to address AGS operation degradation due to faulty AGS position sensors. By having to depend on a functional AGS position sensor to indicate a mechanical fault to even initiate the diagnostic, the diagnostic is in itself incomplete. Furthermore, when AGS system sensor or degradation occurs, completely disabling the AGS system foregoes any fuel consumption reduction advantages that may be preserved by continuing AGS operation in its current capacity.

One approach that at least partially addresses the above issues includes a method, comprising: in response to an output of a first light sensor positioned within a vehicle, behind active grille shutters (AGS), diagnosing a position of the AGS; and in response to the diagnosed position, adjusting an engine operating parameter. In this way, responsive to a change in a light level behind the active grille shutters, it may be determined whether or not the grille shutters are being adjusted as commanded.

In another example, a vehicle system may comprise active grille shutters positioned at a front end of the vehicle; a light sensor positioned within the vehicle, behind and proximate to the AGS; and a controller including non-transitory instructions stored in memory for: while commanding the AGS into an open and then a closed position, monitoring an output of the light sensor; diagnosing a position of the AGS in response to the monitored output of the light sensor relative to a threshold; and adjusting an engine operating parameter in response to the diagnosed position.

In this way, by utilizing a light sensor behind the AGS to diagnose a position of the active grille shutters, degradation modes of the AGS may be determined. These degradation modes may include, but are not limited to, mechanical degradation of the AGS system, which may include a degradation of the AGS motor, stuck or broken grille shutters, or degradation of mechanical linkages between the AGS motor and grille shutters. Additional degradation modes that may be identified include a degraded AGS position sensor, if the AGS system is so equipped. The technical result of using a light sensor to indicate degradation of the AGS system is that partial AGS degradation, where the AGS may still be able to be adjusted to a limited capacity, may be inferred. As a result, operation of the AGS may be continued, albeit in limited capacity, such that the fuel consumption reduction advantages may be preserved to the greatest extent possible. Further still, inferring the AGS position via a light sensor is more reliable over monitoring ambient temperatures and engine temperature changes with respect to an inferred AGS position, as engine temperature may not respond immediately to AGS position changes, and engine temperature may vary for numerous reasons. As a result, by utilizing an output of the light sensor while commanded the AGS into different positions, a position of the AGS may be more accurately diagnosed and a user may be notified if the AGS system needs to be serviced or replaced. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
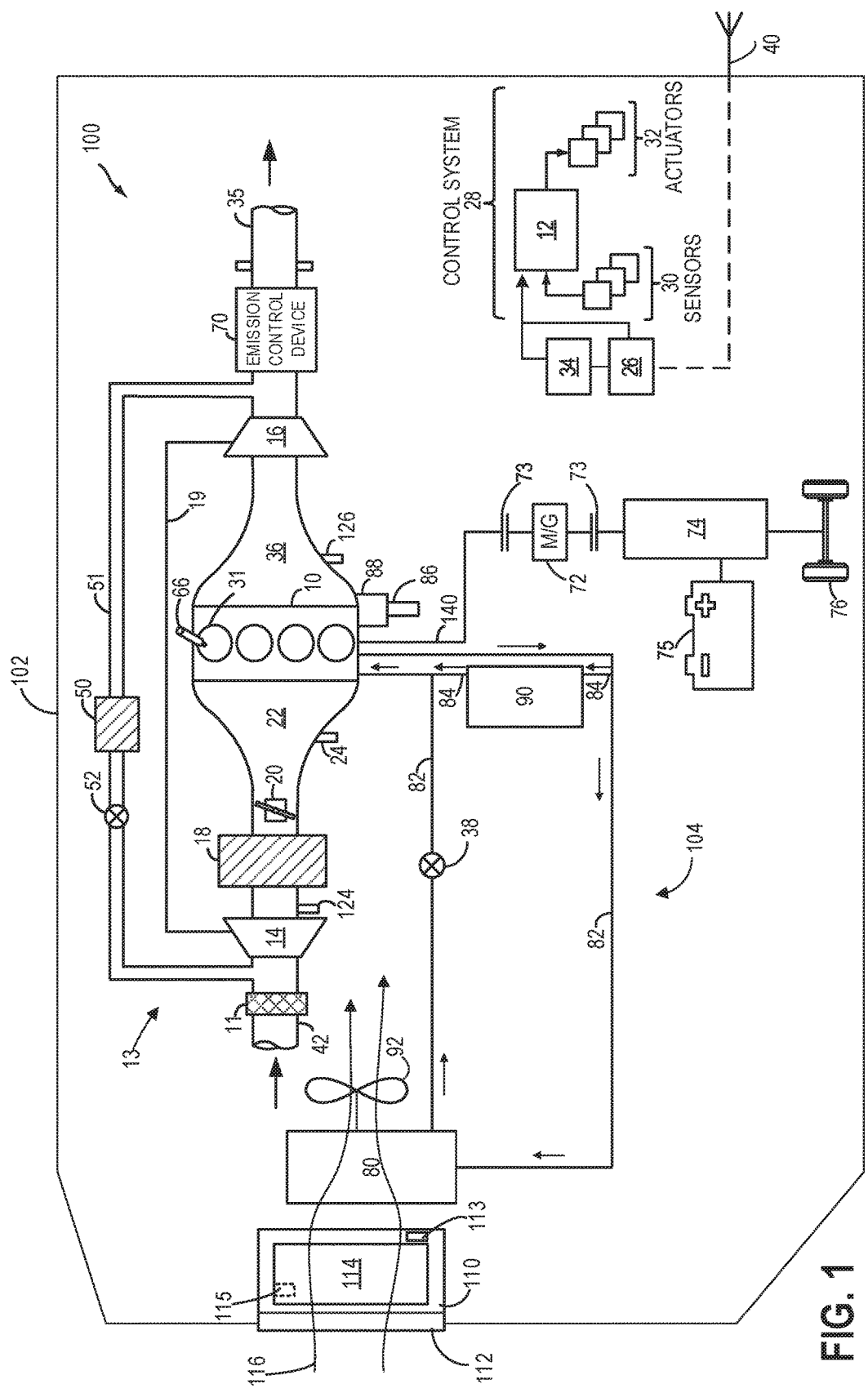
FIG. 1 shows a schematic diagram of a vehicle system, including active grille shutters (AGS), and an engine.
Figure 2:
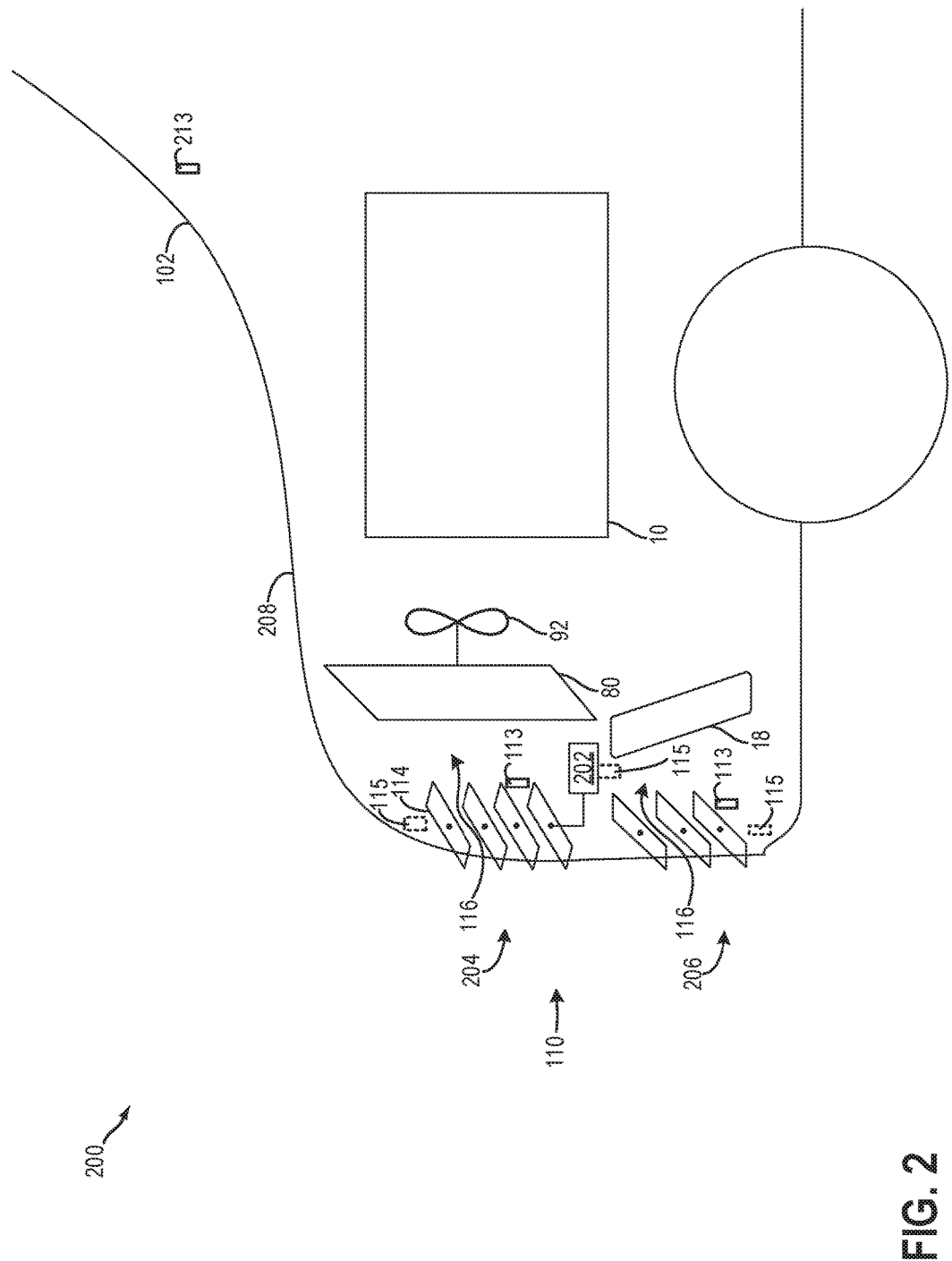
FIG. 2 shows partial schematic of the vehicle of FIG. 1, including the active griller shutters, a radiator, and the engine.
Figure 4:
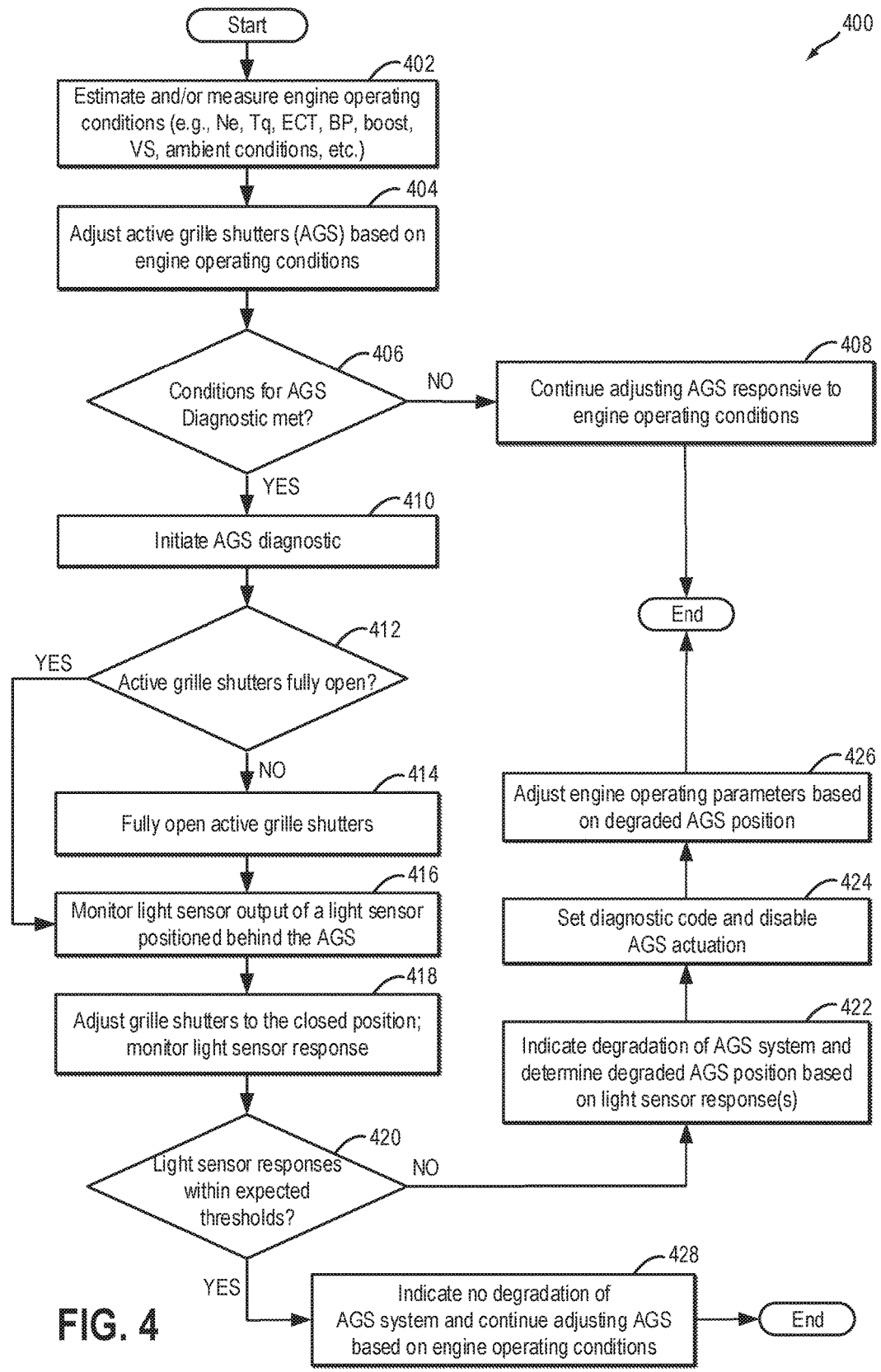
FIG. 4 shows an example routine that may be implemented for operating and diagnosing an AGS system based on a light indication proximate the AGS.
Figure 5:
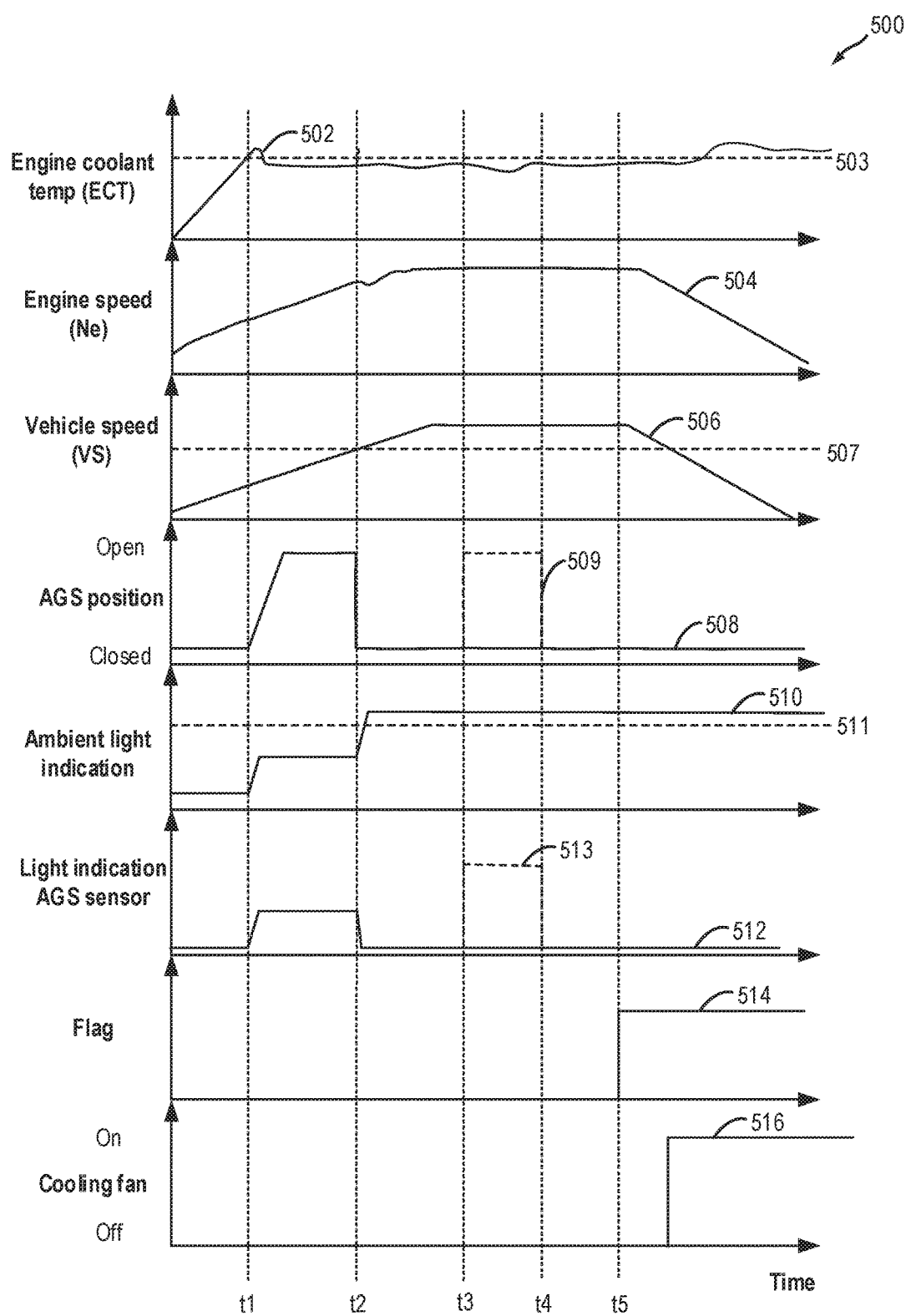
FIG. 5 shows a prophetic operation of an engine including controlling the AGS responsive to engine operating conditions and an AGS diagnostic, according to the present disclosure.

The following description relates to systems and methods for operating active grille shutters (AGS) coupled to an engine included in a vehicle, such as the vehicle system shown in FIG. 1. Active grille shutters may be positioned at a grille of a front end of a vehicle, with one or more light sensors positioned behind the AGS to monitor the amount of ambient light entering through the active grille shutters from the front of the vehicle, as shown in FIG. 2. A percentage opening of the AGS may be adjusted based on engine operating conditions in order to increase or decrease cooling airflow to the engine. Specifically, an engine controller may command an active grille shutter to assume one or more positions with respect to an opening angle of the AGS, such as the different positions shown in FIG. 3. When the active grille shutters are adjusted to a fully open position, an increased amount of ambient light may enter through the grille shutters and impinge on the sensor, eliciting an increased response or output from the light sensor behind the AGS. Likewise, when the active grille shutters are adjusted to a fully closed position, a decreased amount of ambient light may enter through the grille shutters and impinge on the sensor, eliciting a reduced response from the light sensor behind the AGS. By monitoring a response of the light sensor positioned behind the AGS, a degree of opening of the AGS may be inferred. A method for operating an AGS system and executing an AGS diagnostic using the light sensor positioned behind the AGS is shown in FIG. 4, and an example timeline for operating a vehicle system with an AGS system according to the routine of FIG. 4, is shown in FIG. 5.

Turning now to FIG. 1, it shows a schematic of an example vehicle 102, including an engine system 100 and an AGS system 110. Engine system 100 may be included in a vehicle such as a road vehicle, among other types of vehicles. While the example applications of engine system 100 will be described with reference to a vehicle, it will be appreciated that various types of engines and vehicle propulsion systems may be used, including passenger cars, trucks, and the like. Engine system 100 may include an internal combustion engine or a diesel engine.

In some examples, vehicle 102 may be a hybrid vehicle with multiple sources of torque available to one or more vehicle wheels 76. In other examples, vehicle 102 is a conventional vehicle with only an engine, or an electric vehicle with only electric machine(s). In the example shown, vehicle 102 includes engine 10 and an electric machine 72. Electric machine 72 may be a motor or a motor/generator. Crankshaft 140 of engine 10 and electric machine 72 are connected via a transmission 74 to vehicle wheels 76 when one or more clutches 73 are engaged. In the depicted example, a first clutch 73 is provided between crankshaft 140 and electric machine 72, and a second clutch 73 is provided between electric machine 72 and transmission 74. Controller 12 may send a signal to an actuator of each clutch 73 to engage or disengage the clutch, so as to connect or disconnect crankshaft 140 from electric machine 72 and the components connected thereto, and/or connect or disconnect electric machine 72 from transmission 74 and the components connected thereto. Transmission 74 may be a gearbox, a planetary gear system, or another type of transmission. The powertrain may be configured in various manners including as a parallel, a series, or a series-parallel hybrid vehicle.

In the embodiment shown, electric machine 72 receives electrical power from a traction battery 75 to provide torque to vehicle wheels 76. Electric machine 72 may also be operated as a generator to provide electrical power to charge battery 75, for example during a braking operation. It will be appreciated that embodiments that include engine 10 without electrical machine 72, traction battery 75 may be replaced by a starting lighting ignition (SLI) battery.

As shown in the example engine system 100 of FIG. 1, engine 10 is a boosted engine coupled to a turbocharger 13 including a compressor 14 driven by a turbine 16. Specifically, fresh air is introduced at intake passage 42 into engine 10 via air cleaner 11 and compressor 14. The compressor may be a suitable intake air compressor, such as a motor-driven or driveshaft driven supercharger compressor. In the engine system 100, the compressor 14 is shown as a turbocharger compressor mechanically coupled to turbine 16 via a shaft 19, the turbine 16 driven by expanding engine exhaust. In one embodiment, the compressor 14 and turbine 16 may be coupled within a twin scroll turbocharger. In another embodiment, the turbocharger 13 may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the engine intake manifold 22. Ambient airflow 116 from outside the vehicle may enter engine 10 through a vehicle grille 112 at a vehicle front end and pass across the CAC 18, to aid in cooling the charge air. Condensate may form and accumulate in the CAC 18 when the ambient air temperature decreases, or during humid or rainy weather conditions, where the charge air is cooled below the water dew point. When the charge air includes recirculated exhaust gases, the condensate can become acidic and corrode the CAC housing. The corrosion can lead to leaks between the air charge, the atmosphere, and possibly the coolant in the case of water-to-air coolers. Additionally, condensate may collect at the bottom of the CAC 18, and then be drawn into the engine at once during acceleration (or tip-in) increasing the chance of engine misfire. In one example, cooling of ambient airflow traveling to the CAC 18 may be controlled by the AGS system 110 such that condensate formation and engine misfire events are reduced. Specifically, AGS system 110 may include one or more active grille shutters 114 (also known herein as shutters, or grille shutters) that may be selectively controlled responsive to operating conditions including, but not limited to, engine coolant temperature and vehicle speed. In some embodiments, the position of the active grille shutters may be monitored by one or more optional AGS position sensors 115. In the embodiment shown in FIG. 1, the AGS system also includes a light sensor 113 located behind the grille shutters. It will be appreciated that the light sensor 113 is located behind the grille shutters of the vehicle such that it may monitor a change in the amount of light entering through the grille shutters from the front of the vehicle. In this way, light sensor 113 may only be exposed to an upper threshold level of ambient light when the grille shutters are adjusted to a fully open position. As the opening of the grille shutters decrease, the amount of ambient light entering through the grille shutters may decrease, reducing the amount of light striking the light sensor 113. Specifically, the light sensor 113 may be located under a vehicle hood (not shown) and internal to the engine compartment.

In some non-limiting examples, the opening angle of the AGS may be adjusted in order to control condensate formation at the CAC 18, as well as engine cooling and/or vehicle drag. In one example, the opening angle of the AGS may be decreased in order to decrease the amount of cool, humid air entering the grille and passing over the CAC. As a result, the outlet temperature of the CAC 18 may increase, thereby reducing the likelihood of condensate formation. In another example, the opening angle of the grille shutters 114 may be increased in order to increase the amount of cool air allowed to enter through the vehicle grille 112 and pass over the radiator 80. As a result, increased engine cooling may be achieved.

In the embodiment shown in FIG. 1, the pressure of the air charge within the engine intake manifold 22 is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Engine intake manifold 22 is coupled to a series of combustion chambers (e.g., cylinders 31) through a series of intake valves (not shown). In addition, fuel flow to the cylinders 31 may delivered via one or more fuel injectors 66, in a configuration known as direct injection. In some examples, engine 10 may additionally or optionally include fuel injectors located in the intake manifold 22, in a configuration commonly referred to as port injection. The combustion chambers 31 are further coupled to exhaust manifold 36 via a series of exhaust valves (not shown). In the depicted embodiment, a single exhaust manifold 36 is shown. However, in other embodiments, the exhaust manifold 36 may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, the emission control device 70 may include a plurality of emission control devices such as one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve 52 may be opened to admit a controlled amount of cooled exhaust gas to the compressor inlet for desirable combustion and emissions-control performance. In this way, engine system 100 is adapted to provide external, low-pressure (LP) EGR. The rotation of the compressor 14, in addition to the relatively long LP EGR flow path in engine system 100, may provide excellent homogenization of the exhaust gas into the intake air charge. Further, the disposition of EGR take-off and mixing points may provide more effective cooling of the exhaust gas for increased available EGR mass and enhanced performance. In other embodiments, the EGR system may be a high-pressure (HP) EGR system with EGR passage 51 connecting from upstream of the turbine 16 to downstream of the compressor 14.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via a belt, chain, or the like (not shown). Specifically, engine-driven water pump 86 circulates coolant through passages in the engine block, engine head, and the like, to absorb engine heat, which is then transferred via the radiator 80 to ambient air. In an example where engine-driven water pump 86 is a centrifugal pump, the pressure (and resulting flow) produced at the engine-driven water pump outlet may be proportional to the crankshaft speed, which in the example of FIG. 1, is directly proportional to engine speed. In another example, a motor-controlled pump may be used that can be adjusted independently of engine rotation. The temperature of the coolant (e.g., engine coolant temperature, ECT) may be regulated by a thermostat valve 38, located in the coolant line 82, which may be kept closed until the coolant reaches a threshold temperature.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle 102 is moving slowly or stopped while the engine is running. Fan rotation speed or direction may be controlled by a controller 12. In one example, the engine cooling fan may also direct cooling airflow toward CAC 18. Alternatively, electric fan 92 may be coupled to the engine FEAD 88 and driven by the engine crankshaft 140. In other embodiments, electric fan 92 may act as a dedicated CAC fan. In this embodiment, the electric fan 92 may be coupled to the CAC 18 or placed in a location to direct airflow directly toward the CAC 18. In yet another embodiment, there may be two or more electric fans 92. For example, one may be coupled to the radiator (as shown) for engine cooling, while the other may be coupled elsewhere to direct cooling air directly toward the CAC 18. In this example, the two or more electric fans 92 may be controlled separately (e.g., at different rotation speeds) to provide cooling to their respective components.

Coolant may flow through coolant line 82, as described above, and/or through coolant line 84 to heater core 90 where the heat may be transferred via air ducts (not shown) to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory (RAM), keep alive memory (KAM), and a data bus. As depicted, controller 12 may receive input from a plurality of sensors 30, which may include user inputs and/or sensor input data (e.g., transmission gear position, accelerator pedal position input, brake pedal input, transmission selector position, vehicle speed, engine speed, mass airflow through the engine, boost pressure, ambient temperature, ambient humidity, intake air temperature, fan speed, ambient light), cooling system sensors (e.g., engine coolant temperature, fan speed, passenger compartment temperature, ambient humidity), CAC 18 sensors (e.g., CAC inlet air temperature and pressure, CAC outlet air temperature and pressure), one or more optional AGS position sensors 115, AGS light sensor 113, and other vehicle sensors. In addition, controller 12 may receive data from a GPS 34 and/or an in-vehicle communications and entertainment system 26 of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, cloud cover, precipitation (e.g., rain, snow, hail, etc.), and humidity, may be obtained through various wireless communication device applications and weather-forecasting websites. Data obtained from the in-vehicle communications and entertainment system 26 may include current and predicted weather conditions for the current location, as well as future locations along a planned travel route. In one embodiment, where the in-vehicle communications and entertainment system 26 includes a GPS 34, current and future weather data may be correlated with current and future travel routes displayed on the GPS 34. In an alternate embodiment, wherein the vehicle system includes a dedicated GPS 34, each of the GPS 34 and the in-vehicle communications and entertainment system 26 may communicate with the wireless communication device 40, as well as with each other, to communicate current and future weather data with current and future travel routes. In one example, the in-vehicle and communications entertainment system 26 may access various weather maps stored on the internet or other cloud computing systems. The stored weather maps may include rain, humidity, precipitation, ambient light information, and/or temperature information provided as contour maps, for example. In one example, the wireless communication device 40 may relay real-time weather data to the in-vehicle communications and entertainment system 26, and/or GPS 34, which is then relayed to the controller 12. The controller 12 may compare the received weather data (which may include humidity data) to threshold values and determine the appropriate engine operating parameter adjustments. In one example, these adjustments may include adjusting the AGS system 110. For example, if humidity is greater than a defined threshold, one or more vanes of the AGS may be closed.

Furthermore, controller 12 may communicate with various actuators 32, which may include engine actuators (e.g., fuel injectors, an electronically controlled intake air throttle plate, spark plugs), cooling system actuators (e.g., air handling vents and/or diverter valves in the passenger compartment climate control system), AGS system actuators (e.g., AGS vanes, an AGS motor), and others. In some examples, the storage medium of controller 12 may be programmed with computer readable data representing instructions executable by the processor for performing the methods described below as well as other variants that are anticipated but not specifically listed.

As noted herein, the amount of waste heat transferred to the coolant from the engine 10 may vary with vehicle operating conditions, thereby affecting the amount of heat transferred to the air flowing through the engine system 100. For example, as engine output torque, or fuel flow, is reduced, the amount of waste heat generated may be proportionally reduced.

Motor vehicle 102 further includes a vehicle grille 112 providing an opening (e.g., a grille opening, a bumper opening, and the like) for receiving ambient airflow 116 (from outside the vehicle) through or near the front end of the vehicle and into the engine compartment. Entry of ambient airflow 116 into the engine compartment may be controlled by the AGS system 110 as previously described. Heat may be transferred to ambient airflow 116 via radiator 80, electric fan 92, and other components to keep the engine 10 and/or transmission cool. Further, the ambient airflow 116 may reject heat from the vehicle air conditioning system and can increase performance of turbo-charged/supercharged engines that are equipped with a CAC 18 that reduces the temperature of the air that goes into the intake manifold/engine. In one example, the electric fan 92 may be adjusted to further increase or decrease the airflow to the engine components. In another example, a dedicated CAC fan may be included in the engine system 100 for increasing or decreasing airflow to the CAC 18.

Turning now to FIG. 2, example embodiment 200 shows a partial schematic of the vehicle 102 of FIG. 1, including the CAC 18, radiator 80, electric fan 92, engine 10, AGS system 110, and associated ambient airflow 116 passing therethrough. These and other vehicle and engine components may be located underneath a vehicle hood 208. The underneath location may include within a drivetrain compartment of the vehicle, vertically lower than the hood when the vehicle is on level ground, yet above a bottom of the vehicle and/or within an outer skin/body of the vehicle. Other under hood components, such as fuel system, batteries, and the like, may benefit from the cooling airflow as well. Thus, AGS system 110 may assist cooling system 104 (FIG. 1) of engine 10. In the example shown in FIG. 2, AGS system 110 may be a dual active grille shutter system comprising two groups of one or more grille shutters 114, each configured to adjust the amount of airflow received through vehicle grille 112, as shown forward of the grille shutters 114 in FIG. 1. In another example, the AGS system 110 may be an active grille shutter system comprising a single group of one or more grille shutters 114, or more than two groups of one or more grille shutters 114.

Grille shutters 114 may cover a front region of the vehicle spanning from just below the hood 208 to the bottom of the bumper, for example. By covering the vehicle front end, drag may be reduced and entry of external cooling air to the radiator 80 and CAC 18 may be reduced. In some embodiments, all grille shutters 114 may be moved in coordination by the controller 12. In other embodiments, grille shutters 114 may be divided into groups and the controller 12 may adjust opening/closing of each group of grille shutters 114 independently. For example, a first group of grille shutters 204 may be positioned in front of the radiator 80 and a second group of grille shutters 206 may be positioned in front of the CAC 18.

AGS system may optionally include one or more AGS position sensors 115 located in close proximity to the grille shutters 114. In examples that optionally include AGS position sensors, at least one AGS position sensor 115 may be located in close proximity to each group of grille shutters 114. For example, at least one AGS position sensor 115 may be positioned in close proximity to each of the first group of grille shutters 204 and the second group of grille shutters 206. As another example, the AGS position sensor 115 may be arranged in close proximity to an AGS motor 202. In one example, the AGS position sensor 115 may be a Hall effect sensor. A Hall effect sensor may include a transducer that varies its output voltage in response to a magnetic field such as a magnetic field produced by a rotating AGS motor 202. The AGS position sensors 115 may be calibrated in response to a key-on engine status. For example, the AGS may be automatically moved to a fully open position by the controller in response to a key-off engine status. Thus, at key-on, the AGS position sensors may be calibrated to correspond to a fully open position, and subsequent control actions to change the AGS position via the AGS motor 202 may be made relative to the key-on calibration position.

AGS system may also include one or more first light sensors (e.g., AGS light sensors 113) located proximate to the grille shutters 114, internal to the vehicle and inside the underhood area (also referred to as the engine compartment). Specifically, the AGS light sensor 113 may be located behind the grille shutters. In other words, the AGS light sensor 113 may be placed between the grille shutters 114 and the engine 10, on the side of the grille shutters away from the front of the vehicle 102. In one example, at least one AGS light sensor 113 may be located proximate to each group of grille shutters. For example, at least one AGS light sensor 113 may be positioned proximate to each of the first group of grille shutters 204 and the second group of grille shutters 206. In one example, the AGS light sensor 113 may be any type of suitable light sensor, including but not limited to, a photo diode, a photovoltaic sensor, and a solar cell. It will be appreciated that the AGS light sensor 113 may be calibrated in response to a key-on status. As previously described, the AGS may be automatically moved to a fully open position by the controller in response to a key-off engine status and then in response to a key-on engine status, the AGS light sensor may be calibrated to correspond to the light indication for a fully open position, and subsequent control actions to the change the AGS position via the AGS motor 202 may be made relative to the key-on calibration light indication.

Vehicle 102 may also include one or more second light sensors 213. In one example, the second light sensor 213 may include a light sensor located proximate a rear-view mirror, such as the light sensor used to control auto-dimming of a rear view mirror. In other examples, the second light sensor may include a light sensor located on a vehicle dashboard and/or proximate a vehicle headlight, such as the light sensor used to control power-on/power-off and auto-dimming of vehicle headlights. Second light sensor 213 is positioned so that it may be exposed to ambient light conditions external to vehicle 102, while the first light sensor 113 may be exposed to ambient light conditions only when the AGS are not in a fully closed position which blocks light from entering the grille. For example, ambient light and air may enter through the openings created between the grilles as the grilles are adjusted to a partially or fully open position. When the AGS are fully closed, ambient light may be blocked from entering the underhood area, behind the AGS, and thus the light output of the first light sensor 113 may be a threshold amount lower than the light output of the second light sensor 213. The degree or intensity of the ambient light entering the underhood area of the vehicle (and impinging on and detected by the first light sensor 113) may increase as the AGS are opened to a greater degree (e.g., as they approach the fully open position). When the AGS are fully open so that a maximum amount of ambient light may enter the underhood area and hit the first light sensor 113, the light output of the first light sensor 113 may be closest to the light output of the second light sensor 213.

As shown in FIG. 2, the first group of grille shutters 204 may be positioned vertically above, with respect to a surface on which vehicle 102 sits, the second group of grille shutters 206. As such, the first group of grille shutters 204 may be referred to as the upper grille shutters and the second group of grille shutters 206 may be referred to as the lower grille shutters. An amount of opening of the first group of grille shutters 204 may control an amount of ambient airflow 116 directed to the radiator 80 and an amount of opening of the second group of grille shutters 206 may control an amount of ambient airflow directed to the CAC 18. As such, the upper grille shutters may largely affect vehicle drag and engine cooling while the lower grille shutters may largely affect CAC cooling. However, it will be appreciated that the one or more groups of grill shutters may also be arranged horizontally side-by-side, rather that vertically above or below another group of grille shutters.

In some examples, each group of grille shutters 114 may contain the same number of grille shutters 114, while in other examples one group of grille shutters may contain a greater number of grille shutters than the other group. In one embodiment, the first group of grille shutters 204 may contain multiple grille shutters, while the second group of grille shutters 206 contains one grille shutter. In an alternate embodiment, the first group of grille shutters may contain one grille shutter, while the second group of grille shutters may contain more than one grille shutter. In alternate embodiments, all the grille shutters 114 may be included in a single group of grille shutters and an amount of opening of the single group of grille shutters 114 may affect vehicle drag, engine cooling, and CAC cooling.

Grille shutters 114 may be positioned between fully open position and a fully closed position, and may be maintained at the fully open position, the fully closed position, or a plurality of intermediate positions therebetween. In other words, opening of grille shutters 114 may be adjusted such that grille shutters 114 are opened partially, closed partially, or cycled between a fully open position and a fully closed position to provide airflow for cooling engine system components. The fully open position may be referred to as a maximal amount of opening (or maximal percentage opening) position and the fully closed position may be referred to as a maximal amount of closing (or maximal percentage closed) position. An amount of opening of the grille shutters 114 or group of grille shutters (e.g., first group of grille shutters 204 or second group of grille shutters 206) may be denoted by a percentage (e.g., percentage opening). For example, when the AGS are halfway between an opened and closed position, the AGS may be 50% open (or 50% closed).

When the AGS are opened to the maximal percentage opening (e.g., an upper threshold amount of opening), the AGS may be 100% open.

The grille shutters 114 (e.g., upper grille shutters) may be actuated by an AGS motor 202. AGS motor 202 may be operatively coupled to the control system 28, as shown in FIG. 1. As an example, controller 12 may be communicably connected to AGS system 110, and may have executable instructions stored thereon to adjust opening of grille shutters 114 via AGS motor 202. Controller 12 may send signals for adjusting the AGS system 110 to AGS motor 202. These signals may include commands to increase or decrease the opening of the upper and/or lower grille shutters. As an example, controller 12 may output voltages to AGS motor that correspond to fully opening, fully closing, or partially opening the grille shutters 114. For example, controller 12 may output a voltage to the AGS motor 202 to open the upper grille shutters to 30% open. Correspondingly, the AGS motor 202 may draw an AGS motor current upon fully opening, fully closing, or partially opening the grille shutters 114. Furthermore, the controller 12 may detect or measure the AGS motor current to determine an AGS position. Further still, the output voltage to the AGS motor and the AGS motor current may be of a first polarity when rotating the AGS motor in a first direction (e.g., corresponding to opening the AGS grille shutters), and the output voltage to the AGS motor and the AGS motor current may be of a second polarity opposite to the first polarity when rotating the AGS motor in a second direction opposite to the first direction (e.g., corresponding to closing the AGS grille shutters).

AGS motor 202 may be coupled to one or more grille shutters 114. For example, AGS motor 202 may be coupled to a first grille shutter 114, the first grille shutter mechanically linked to the remaining grille shutters 114. In another example, AGS motor 202 may be coupled to each grille shutter 114 or each group of grille shutters. Further, in some examples, the AGS system 110 may include more than one motor for controller more than one group or more than one individual grille shutter. The AGS system include a smart motor that communicates with the controller 12 of FIG. 1 over a multiplex bus, for example. In some examples, the AGS motor may include an output shaft connected to an AGS housing (not shown) and to one of a plurality of the movable vanes which are linked together to form a group. When the AGS motor output shaft moves, it moves the attached vane which causes the other vanes in the group to move together. In some examples, a mechanical linkage (not shown) that may include gears, may be provided between the vane sets in a master/slave relationship.

Figure 3:
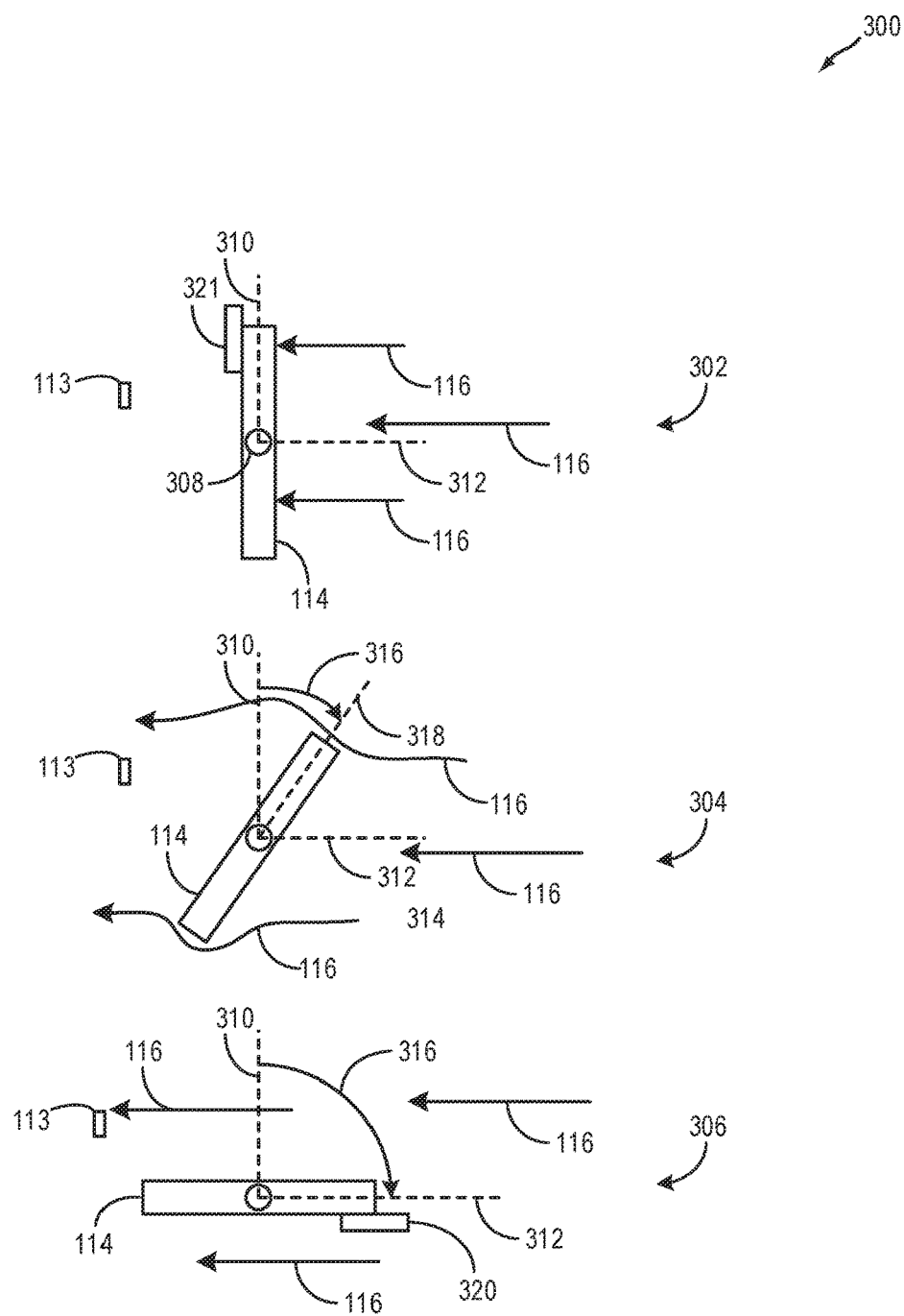
FIG. 3 shows a schematic of various vane positions of the active grille shutter system of FIG. 3.

Turning now to FIG. 3, it shows example grille shutter positions for a single vane (e.g., a single grille shutter 114). Specifically, schematic 300 shows a side view of a grille shutter 114 (such as the grille shutter 114 shown in FIG. 2). The grille shutter 114 may rotate about a second shaft 308 located on a central rotational axis of the vane. The grille shutter 114 may rotate between a fully closed to a fully open position defined by a vertical axis 310 and lateral axis 312 of the AGS, respectively.

A first grille shutter position is shown at 302. The first grille shutter position is a fully closed position in which the AGS are fully closed, thereby preventing airflow and/or ambient light 116 from entering the vehicle through the grille. A light sensor 113 located on the opposite side of the grille shutters 114, inside the underhood area of the vehicle, as the incoming airflow and ambient light 116 (from outside the vehicle) may generate a sensor output indicating the amount of ambient light passing through the grille shutters. The amount of light entering through the grille shutters when the grille shutters are fully closed would be less than when the grille shutters are partially or fully open. The percentage opening when the AGS are fully closed may be 0%, and the percent closing when the AGS are fully closed may be 100%. When the AGS are fully closed, the amount of ambient light entering through the grille shutter openings will be lower than when the grille shutters are fully open. In position 302, the vane axis 318 (shown in position 304) of the grille shutter 114 may align with the vertical axis 310 such that an angle between the grille shutter 114 and the vertical axis 310 may be approximately 0° (vane axis 318, as shown at 304, is parallel with the vertical axis 310). This angle may be referred to as the opening angle. In other embodiments, the fully closed grille shutter position may be slightly larger than 0° (e.g., 5°) to allow for overlapping of adjacent grille shutters.

In one example, upon reaching the fully closed position (e.g., maximal percentage closing of 100% (and percentage opening of 0%), the grille shutter 114 may contact an end stop 321. The end stop 321 may be coupled to a support structure (e.g., an outer frame) of the AGS system 110. For example, the end stop 321 may be positioned along a vertical axis 310 of at least one grille shutter 114 of a group of grille shutters. As such, at least one grille shutter 114 of the group of grille shutters may contact the end stop 321 upon reaching the maximal percentage closing position of 100%.

A second grille shutter position is shown at 304. The second grille shutter position is an intermediate position between a fully open and a fully closed position in which the grille shutter 114 may be partially open (or partially closed). The opening angle 316 is defined between the vertical axis 310 and the vane axis 318 of the grille shutter 114. In one example, the opening angle 316 may be approximately 36° such that the percentage opening of the AGS is approximately 40%. In another example, the opening angle may be approximately 9° such that the percentage opening of the AGS is approximately 10%. In some cases, the controller may also determine a percentage closing of the AGS. For example, the percentage closing of the AGS may be calculated as 100 minus the percentage opening. In the example of the percentage opening being 40%, the percentage closing is 60%. The partially open grille shutter 114 allows ambient light and/or airflow 116 to flow around the vane, through the opening created by the partially open grille shutter 114, and into the vehicle and toward the engine. The incoming ambient light may strike and elicit an electrical response from light sensor 113. It will be appreciated that for a constant ambient light condition external to the vehicle and the grille shutters 114 (e.g., from the direction of ambient light and airflow 116) the light sensor 113 response for grille shutter position 304 may be greater than the light sensor 113 response for grille shutter position 302. Additionally, the light sensor 113 response may be less than the response from second light sensor 213, as shown in FIG. 2.

A third example grille shutter position is shown at 306. The third grille shutter position is a fully open position, thereby allowing maximal ambient airflow and/or ambient light 116 to enter the vehicle and engine compartment through the grille. Thus, the fully open position may be referred to herein as a maximal opening or maximal percentage opening. When the AGS are fully open, the opening angle 316 is approximately 90° (vane axis 318 is parallel with the lateral axis 312) and the percentage opening is 100%. Similarly, ambient light and airflow 116 may pass the grille shutter 114 relatively unobstructed, and the ambient light may strike and elicit a response from first light sensor 113. It will be appreciated that for a constant ambient light condition external to the vehicle and the grille shutters 114 (e.g., from the direction of ambient light and airflow 116) the light sensor 113 response for grille shutter position 306 may be greater than the light sensor 113 response for grille shutter positions 304 and 302. Further, the output from light sensor 113 for grille shutter position 306 may be closer to the response from second light sensor 213 (from FIG. 2) than it would be for active grille shutter position 304 or 302. In one example, upon reaching the maximal percentage opening of 100% (and an opening angle of 90°), the grille shutter 114 may contact an end stop 320. The end stop 320 may be coupled to a support structure (e.g., an outer frame) of the AGS system 110. For example, the end stop 320 may be positioned along a lateral axis of at least one grille shutter 114 of a group of grille shutters. As such, at least one grille shutter 114 of the group of grille shutters may contact the end stop 320 upon reaching the maximal percentage opening of 100%.

In this way, grille shutter vanes 114 of a AGS system 110 may be adjusted into a plurality of positions between 0% open (fully closed position) and 100% open (maximal percentage opening or fully open position). An AGS motor, shown in FIG. 1, may actuate the grille shutters 114 into different positions via mechanical linkage (not shown) based on a commanded grille shutter position.

During normal operation, the AGS may be fully open when the engine is off. When starting a cold engine, the controller 12 may command the AGS to remain closed for a duration to allow for the engine to warm and reach efficient operating temperatures more quickly, which can aid in reducing fuel consumption and engine emissions. Controller 12 may also command the AGS to close to block airflow through the grille when the engine is cool and engine loads are low, which can aid in reducing vehicle drag and fuel consumption. The AGS may also be closed at higher vehicle speeds, especially during constant cruising speeds and low engine loads, to reduce fuel consumption. When the engine temperature is to be lowered, the AGS may be commanded open by controller 12. The AGS control may also be used to aid in controlling engine coolant temperatures, condensate formation, HVAC performance, and exhaust emissions, responsive to one or more of a vehicle speed, engine coolant temperature, and engine load.

During vehicle operation, various means of AGS degradation may occur. The AGS grille shutters 114 may become stuck in one position (e.g., a stationary position despite actuation via the motor) or broken due to mechanical degradation of parts of the AGS system or foreign debris entering the front vehicle grille 112, as described with reference to FIG. 1. The mechanical linkages between the AGS motor 202 and the grille shutters 114 may degrade or become worn or damaged with time. The AGS motor 202 may also experience mechanical degradation or may continue to function without a load in the presence of degraded mechanical linkages with the grille shutters 114.

By positioning a light sensor behind the active grille shutters, the amount of ambient light entering engine compartment through the openings between the grille shutters (which may also be referred to herein more simply as "through the grille shutters") may be monitored. In one example, in response to an output of the first light sensor 113 positioned underneath the hood (e.g., hood 208 of FIG. 2) of a vehicle, behind active grille shutters 114, a position (e.g., degree of opening) of the AGS may be diagnosed (e.g., determined).

As described above, the AGS system 110 may optionally include AGS position sensors 115. As an example, AGS position sensors 115 may comprise Hall Effect sensors and may be used to determine AGS position in an AGS position feedback control strategy. If the AGS position sensors lose functionality, the AGS feedback control strategy may no longer determine the grille shutter position directly from the AGS position sensors. It will be appreciated that in AGS system embodiments that include AGS position sensors, in addition to AGS mechanical type degradation, AGS position sensors 115 may be degraded or may malfunction due to damage or contamination from the environment. Other embodiments may include a temperature sensor proximate an AGS system in order to attempt to determine whether the active grille shutters have assumed the commanded position and identify potential degradation responsive to temperature sensor output. It will be appreciated that the AGS light sensor positioned behind the AGS may be further used to confirm operation or imply degradation of other AGS system sensors, such as an AGS position sensor or AGS temperature sensor. The ability to infer or determine AGS position using an alternate method (e.g., alternate to using AGS position or temperature sensors) when these AGS sensors degrade may allow for at least partial continued operation of the AGS. For example, if the AGS may still be fully opened but not fully closed, at least a portion of the reductions in fuel economy conferred by operation of the AGS system 110 may be preserved. Conversely, in the event of a full mechanical AGS degradation that includes the AGS stuck in a position and unable to be adjusted, an engine parameter may be adjusted in order to mitigate potential deleterious effects of a stuck AGS system. In one example, responsive to an AGS stuck in a closed position, a cooling fan may be activated earlier than it would have otherwise been, in order to provide sufficient cooling to the engine. In another example, an HVAC output may be reduced in order to reduce the load on the engine, thereby also reducing the cooling requirements of the engine. Further examples may include moving the AGS to a default position and disabling a further adjustment of the AGS responsive to an engine operating condition. In this way, engine overheating may be avoided and/or the likelihood of AGS motor burnout and/or other AGS system damage may be reduced.

In this manner, a system for a vehicle may include active grille shutters (AGS) positioned at a front end of the vehicle; a first light sensor positioned within the vehicle, behind and proximate to the AGS; and a controller including non-transitory instructions stored in memory for: while commanding the AGS into an open and then a closed position, monitoring an output of the light sensor; diagnosing a position of the AGS in response to the monitored output of the light sensor relative to a threshold; and adjusting an engine operating parameter in response to the diagnosed position.

Turning now to FIG. 4, it illustrates a routine 400 of operating an AGS system (such as AGS system 110 shown in FIGS. 1-2), including a method for diagnosing a position of the AGS. One example of a diagnosed position of the AGS includes a position that differs from a commanded position (e.g., degradation). Routine 400 also includes responding to a diagnosed position of the AGS, including degradation, based on a light indication proximate the AGS. In other words, method 400 may comprise performing a type of rationality testing on the AGS system to ascertain if the active grille shutters of the AGS system are mis-positioned (e.g., in a position different than commanded) or stuck in one position, and/or if one or more components of the AGS system are degraded. Instructions for carrying out method 400 and the rest of the methods included herein may be executed by a controller (e.g., controller 12 of FIG. 1) based on instructions stored on a memory of the controller and in conjunction with signals received from sensors of the engine system (e.g., engine system 100 of FIG. 1), such as the sensors described above with reference to FIG. 1. The controller may employ engine actuators of the engine system to adjust engine operation, according to the methods described below.

Routine 400 starts at 402, where the routine includes estimating and/or measuring engine operating conditions that may include engine speed (Ne), operator torque demand (Tq), engine coolant temperature (ECT), barometric pressure (BP), engine boost, vehicle speed (VS), an ambient light condition (e.g., as indicated by an output of a light sensor, such as second light sensor 213 shown in FIG. 2), ambient temperature, and ambient humidity. The routine then continues to 404, where the routine includes adjusting the active grille shutters (e.g., active grille shutters 114 of FIG. 2) based on engine operating conditions. Adjusting the active grille shutters may include a vehicle controller (e.g., controller 12 of FIG. 1) sending a signal to a motor (AGS motor 202 of FIG. 2) coupled to the active grille shutters (via a mechanical linkage, in one example) to adjust the degree of opening of the active grille shutters (e.g., opening angle or percentage opening). In one example, responsive to starting a cold engine (e.g., engine 10 of FIG. 1) when an engine coolant temperature (ECT) is below a threshold, the active grille shutters may be adjusted to a fully closed position, thereby blocking ambient air and light from entering the underhood area of the vehicle, in order to reduce inlet of cool air and expedite rapid warming of the engine. In another example, responsive to an engine coolant temperature (ECT) above a threshold, the controller may send a signal to the AGS motor in order actuate the mechanical linkage coupled to the AGS to increase the opening angle of the active grille shutters to increase the amount of air entering the grille to facilitate increased engine cooling. In this way, adjustment of the AGS may be used to actively control engine coolant temperatures and increase engine performance and fuel efficiency. Additionally, the AGS may be selectively controlled responsive to an indication of ambient humidity from a humidity sensor and other engine parameters to mitigate condensate build-up in a charge air cooler (e.g., CAC 18 of FIGS. 1 and 2). In a further example, responsive to a vehicle speed above a threshold and an engine coolant temperature below a threshold, the vehicle controller may send a signal to the AGS motor coupled to the active grille shutters to adjust the degree of opening of the active grille shutters to a fully closed position. In this way, the likelihood of excessive engine cooling may be reduced by decreasing the amount of intake air entering through the grille. In addition, by decreasing the amount of intake air entering through the grille, vehicle drag may also decrease, which may lead to increased fuel economy.

At 406, the routine includes determining whether conditions for the AGS diagnostic have been met. AGS diagnostic conditions may include, for example, determining whether a threshold duration has elapsed since the previous AGS diagnostic was performed. It will be appreciated that it may be suitable to perform the AGS diagnostic routine after a threshold time duration has elapsed (e.g., after 7-10 days or after 12 hours of engine operation, for example) or after a threshold number of engine start/stop conditions have elapsed (e.g., after 10 engine starts, for example). It will be appreciated that by default, initiating the diagnostic on a routine basis as described above may be suitable. However, in some examples, the AGS diagnostic routine may also be initiated responsive to an engine parameter outside a threshold. For example, if an engine parameter, such as engine coolant temperature, exceeds a temperature threshold indicating engine overheating during city driving conditions, the AGS diagnostic routine may also be initiated to determine whether the AGS may be stuck closed, contributing to the increase in engine coolant temperatures. In this way, the AGS diagnostic routine may be scheduled routinely as a preventative diagnostic, and/or performed as a reactionary measure to diagnose or vindicate the AGS system responsive to an indication of an engine parameter outside a threshold.

Additional or alternate conditions for initiating a diagnostic of the AGS may include an indication of a daylight condition. In one example, a daylight condition may be determined by the output of a light sensor. In some examples, the light sensor may be an auto-dim light sensor coupled to a rearview mirror, or a light sensor associated with automatic control of vehicle headlights, which may be located on a dashboard or external to underneath a hood (e.g., hood 208 of FIG. 2) of the vehicle (e.g., second light sensor 213 of FIG. 2 In other examples, a daylight condition may be determined by a real-time weather report received at a controller of the vehicle, or a real-time onboard clock indicating a day time. As previously mentioned, data obtained from an in-vehicle communications and entertainment system (e.g., in-vehicle communications and entertainment system 26 of FIG. 1) may include real-time and forecasted weather conditions. Weather conditions such as cloud cover and precipitation (e.g., rain, snow, hail, etc.) may be obtained through various wireless communication device applications and weather-forecasting web sites.

It will be appreciated that the AGS diagnostic may be performed during non-daylight hours providing there is some indication of ambient light forward of the vehicle. This may include light projected or reflected from vehicle headlights (e.g., headlights from vehicle 102 of FIG. 1 or another vehicle), ambient lights in a parking facility, or any other suitable light source forward of the vehicle. Additionally, it will be appreciated that, in one example, the AGS diagnostic may be performed during any driving or non-driving mode and during any ambient temperature condition. For example, the AGS diagnostic may be performed during any driving mode, which may include, but is not limited to, an idle condition, an engine off condition, a start/stop driving mode, city driving mode, highway driving mode, and an electric vehicle mode. As a result of being able to perform the AGS diagnostic during any driving or non-driving mode and during ambient temperature condition, a robust diagnostic that is independent of vehicle operator driving habits and weather conditions is provided. An additional condition for initiating the AGS diagnostic may include a vehicle speed above a threshold speed, where the diagnostic is performed while the vehicle is being propelled.

If conditions for the AGS diagnostic are not met, then the routine proceeds to 408, where the routine includes continuing to adjust the AGS responsive to engine operating conditions as described above, with reference to 404, before ending.

If conditions for the AGS diagnostic are met, then the routine proceeds to 410, where the routine includes initiating the AGS diagnostic. Initiating the AGS diagnostic may include recording a baseline ambient light level reading via a light sensor positioned external to underneath the hood of the vehicle, such as second light sensor 213 of FIG. 2. After initiating the AGS diagnostic, at 412, the routine includes determining whether the active grille shutters are open (e.g., fully open). As previously described with reference to the example position 306 shown FIG. 3, a fully open position may allow a maximal amount of ambient airflow and/or ambient light to enter the underhood area and engine compartment of the vehicle through the grille. The fully open position may be considered the maximal opening or maximal percentage opening. In one example, determining whether the grille shutters are fully open may include the controller receiving sensor data from a position sensor (e.g., AGS position sensor 115 of FIGS. 1 and 2) if the AGS system includes a position sensor. A light sensor positioned behind the active grille shutters (e.g., AGS light sensor 113 of FIGS. 1-3) may also provide an indication that the grille shutters are in a fully open position. A fully open grille shutter position may correlate with a light sensor indication from behind the grille shutters that is equivalent to an ambient light sensor indication, as may be inferred by a light sensor positioned in full exposure of ambient light (e.g., second light sensor 213 of FIG. 2). It will be appreciated that the light sensor positioned behind the active grille shutters may include the light sensor being positioned on a side of the grille shutters that faces away from the front grille of the vehicle (e.g., vehicle grille 112 of FIG. 1). In other words, the light sensor being positioned behind the AGS may include the light sensor being positioned between the active grille shutters and the engine, underneath a vehicle hood. Other methods of determining the AGS are fully open may include a proximity sensor on an end stop (e.g., end stop 320 of FIG. 3). In yet another example, determining the AGS are fully open may include determining if the last commanded position of the AGS was a fully open position.

If the AGS are not fully open, then the routine proceeds to 414, where the routine includes fully opening the active grille shutters. Fully opening the active grille shutters may include the controller sending a signal to the AGS motor to start the motor in order to actuate a mechanical linkage and adjust the AGS to a fully open position. In one example, this may include increasing the amount of opening to the maximal percentage opening. In some examples, this may include increasing the opening of the grille shutters until they contact an end stop (e.g., end stop 320 of FIG. 3). In an alternate embodiment, the AGS diagnostic may be performed by adjusting the AGS between a partially open and closed position. Thus, in this embodiment, the method at 414 may include increasing the amount of opening of the AGS so that they are partially open (e.g., 80% open), but they may not be fully open.

If the AGS are fully open at 412, or have been adjusted to a fully open position at 414, the routine continues to 416, where the routine includes monitoring a light sensor output of a light sensor positioned behind the AGS. Monitoring the light sensor response may include monitoring a first sensor response from the first light sensor, located behind the AGS. In this way, the amount of light entering through the AGS may be inferred, and changes to the position (e.g., percentage opening) of the AGS may elicit predictable and corresponding changes to the amount of light entering through the AGS. For example, if the AGS are fully open, a maximum amount of ambient light (e.g., ambient light 116 of FIGS. 1 and 2) may enter through the grille shutters and generate an increased sensor output (e.g., increased voltage reading). Conversely, if the AGS are fully closed, a minimum amount of ambient light may enter through the openings between grille shutters, generating a decreased light sensor output. In other examples, monitoring the light sensor response may also include monitoring a first response from a second light sensor, located external to underneath the hood of the vehicle. In this way, a baseline ambient light level may be monitored to provide a baseline ambient light condition for comparing with the light response indicated by the first light sensor. In this way, even if ambient light conditions vary during the AGS diagnostic, the light response from the first light sensor may be compared to current ambient light conditions. Specifically, when the AGS are fully open, it may be suitable for the first response of the first light sensor to closely correlate with the first response of the second light sensor as the AGS are not blocking ambient light from reaching the first sensor.

At 418, the routine includes adjusting the grille shutters to the closed position and monitoring the light sensor response (e.g., output). In one example, adjusting the grille shutters to the closed position may include the vehicle controller sending a signal to the AGS motor in order to actuate the mechanical linkage coupled to the AGS and decrease the percentage opening of the grille shutters to 0%. In one example, this may include the grille shutters contacting an end stop (e.g., end stop 321 of FIG. 3), as shown in example position 302 of FIG. 3. In this fully closed position, ambient light may be reduced or substantially prevented from entering the engine compartment through the grille and thus a response (e.g., output) from the first light sensor, located behind the AGS, will be reduced. In an alternate embodiment, the method at 418 may include decreasing the amount of opening of the AGS so that they are more closed than the position at 414 but not fully closed (e.g., 10% open). In addition to adjusting the grille shutters to the closed position at 418, the light sensor response is monitored. Monitoring the light response may include monitoring the light response from the first light sensor and monitoring the light response from the second light sensor.

The routine then proceeds to 420, where the routine includes determining whether the light sensor responses (e.g., outputs) of the light sensor positioned behind the AGS (e.g., first light sensor 113), at the open and closed positions, are within expected thresholds. In one example, expected thresholds may include a threshold between the first light sensor output of the first light sensor positioned behind the grille shutters, underneath the hood, and the second light sensor output of the second light sensor positioned external to underneath the hood and exposed to ambient light, when the AGS are commanded to an open position. In one example, when the AGS are adjusted to the fully open position, the light indication (e.g., sensor output or sensor response) from the first sensor may be within a threshold of the light indication (e.g., sensor output or sensor response) from the second sensor. This is due, in part, to the grille shutters not impeding ambient light from entering the grille and striking the first light sensor. In this way, the light indication from the first and second light sensors are expected to be approximately the same when the grille shutters are fully open. Additionally, expected thresholds may include a threshold difference between a first sensor response from the first light sensor when the AGS are commanded to an open position and a second sensor response from the first light sensor when the AGS are commanded to a closed position. Specifically, when the AGS are in the fully open position, the light indication from the first sensor is expected to be greater than the light indication from the first sensor when the AGS are in the fully closed position. This is a result of the grille shutters impeding an increasing amount of ambient light from reaching the first light sensor as the grille shutter opening(s) decrease. Thus, the first light sensor response may be expected to be a threshold amount greater than the second light sensor response. Other thresholds may include comparing the sensor data from one or more first light sensors, if the AGS system includes more than one. In some embodiments, a light sensor may be positioned behind each group of active grille shutters. In this way, it may be determined whether each group of grille shutters is being adjusted as commanded. Further, if more than one light sensor is positioned behind the AGS, the average output of all light sensor data may be used in order to reduce variability and/or noise in sensor data. Additionally, in embodiments of the AGS diagnostic that include commanding the AGS between a partially open and partially closed position, the expected thresholds may be different than the expected thresholds for when the AGS are commanded between a fully open and fully closed position. It will be appreciated that if a sudden or unexpected change of ambient light occurs during of the diagnostic, the routine may be disabled.

If the light sensor responses of the first light sensor are not within expected thresholds, the routine proceeds to 422, where the routine includes indicating degradation of the AGS system and determining a degraded AGS position based on light sensor response(s). In one example, responsive to a command to increase the opening of the AGS, the light indication from the first light sensor is expected to increase toward an ambient light level, which may be indicated by the second light sensor, positioned external to underneath the hood. Additionally, responsive to a command to move the AGS from an open to a closed position, the light indication from the first light sensor is expected to decrease by more than a threshold light level. In this way, the AGS may be diagnosed as being in a stuck closed position based on a first light sensor response not decreasing by more than a threshold amount when the AGS are commanded closed and/or when the first light sensor response differs by more than a threshold value from the second light sensor response when the AGS are commanded open.

In another example, the AGS may be diagnosed as being in a stuck open position based on a first light sensor response not increasing by more than a threshold amount when the AGS are commanded open and/or when the first light sensor response differs by less than a threshold value from the second light sensor response when the AGS are commanded open.

Further, for embodiments of the engine system that include an AGS position sensor, the AGS diagnostic may also ascertain information regarding the functionality of the position sensor and the AGS light sensor by monitoring sensor outputs during the diagnostic. For example, if the output of the first AGS light sensor does decrease responsive to a command to close the grille shutters from the open position, and the AGS position sensor does not indicate a decreased opening of the grille shutter position, then this may be indicative of a degraded AGS position sensor. Alternately, if the output of the first AGS light sensor does not decrease responsive to a command to close the grille shutters, but the AGS position sensor indicates that the opening of the grille shutters did move to a closed position, then degradation of the AGS light sensor may be inferred. Other system sensor functionalities may be evaluated as part of the AGS diagnostic, including a temperature sensor proximate the grille shutters.

The routine then continues to 424, where the routine includes setting a diagnostic code responsive to the indication of AGS degradation and disabling AGS actuation. Setting the diagnostic code may include setting a code within the controller that indicates the AGS system is degraded, stuck in one position (e.g., open, closed, or some position between fully open and fully closed), or mispositioned. In addition to setting a diagnostic code, the controller may also illuminate a malfunction indicator light (MIL) on an operator display panel (not shown) inside a passenger compartment of the vehicle. In one example, at 422, the AGS diagnostic may have determined that the AGS were stuck closed, and so a diagnostic code indicating such may be set. In another example, at 422, the AGS diagnostic may have determined that the AGS position sensor is degraded, and so a diagnostic code indicating such may be set. In this way, the specific degradation mode may be indicated. Optionally, at 424, the routine may further include moving the AGS to a default position, if the AGS are not stuck. In one example, the default position may be the fully open position, or the most open position possible, however other default positions may be suitable. Further, AGS actuation may be disabled responsive to an indication of a degraded AGS system in order to reduce the likelihood of damaging the AGS motor or mechanical linkage. Disabling AGS actuation may be responsive to an indication of stuck AGS. Specifically, disabling AGS actuation may include the controller not sending a signal to adjust the position of the AGS even when vehicle and/or engine operating conditions may indicate that adjustment of the grille shutters would be otherwise indicated. For example, responsive to an indication that the grille shutters are stuck partially open, the grille shutters may not be commanded to a fully closed position even if the vehicle speed and engine coolant temperature are above their respective thresholds for adjusting the AGS to a fully closed position.

In other examples, rather than disabling future operation of the AGS system, it may be appropriate to continue to operate the AGS in its current capacity without completely disabling the AGS system and foregoing any fuel consumption reduction advantages that may be preserved by continuing AGS operation, albeit limited in capacity. This may occur in examples where the AGS may be unable to move to a fully open position or a fully closed position due to obstructing debris, but the grille shutters may otherwise continue to be controlled reliably.

At 426, the routine includes adjusting engine parameters based on the degraded AGS position determined at 422. In some examples, this may include adjusting one or more of an engine fan, a water pump, an HVAC system, an engine load, and a vehicle auxiliary load. As previously described, if the AGS are stuck in the closed position, this may reduce the amount of fresh intake air entering the vehicle grille to facilitate sufficient engine cooling under certain engine operating conditions. Therein, stuck grille shutters may contribute to unintended elevation of engine coolant temperatures, so controlling (e.g., adjusting) a suitable engine parameter may mitigate a potentially problematic temperature rise of engine components. In one example, responsive to reaching a vehicle and/or engine operating condition that would evoke a command to open the grille shutters, the controller may activate a cooling fan (e.g., electric fan 92 of FIG. 1) in order to increase an engine cooling effect to compensate for the degraded AGS system. In another example, the controller may reduce a cooling output of the HVAC system in order to reduce the engine load and reduce the cooling requirements on the engine system. After 426, the routine ends.

If the light sensor responses are within expected thresholds at 420, the routine proceeds to 428 where the controller may indicate no degradation of the AGS and continue adjusting AGS based on engine operating conditions as previously described. After 428, the routine ends.

Turning now to FIG. 5, it shows a prophetic operation map 500 of an engine system, such as engine system 100 of FIG. 1, including controlling the AGS responsive to engine operating conditions. The engine system may also have the capability of performing an AGS diagnostic routine using a light sensor located behind the active grille shutters, such as the diagnostic routine shown in FIG. 4 and second light sensor 213 shown in FIG. 2. The AGS position may be controlled by a vehicle controller, and responsive to an indication of a degraded AGS position, the controller may adjust an engine parameter to mitigate the effects of the degradation in order to maintain sufficient engine cooling. By using a light sensor to monitor the AGS for degradation or mis-positioning, a robust diagnostic is provided that may be performed during any driving or non-driving condition, and during any ambient temperature. The map 500 of FIG. 5 depicts an engine coolant temperature (ECT) at plot 502, an engine speed (Ne) at plot 504, a vehicle speed (VS) at plot 506, an AGS opening position at plot 508, and an ambient light indication at plot 510. It will be appreciated that the ambient light indication of plot 510 may be output from a light sensor that is not located within the engine compartment or behind the AGS, as previously described. Rather, ambient light levels may be inferred by a sensor located outside the engine compartment. Example of locations of the ambient light sensor may include a vehicle dashboard, a rear view mirror, and proximate a headlight. Map 500 additionally includes a light indication from an AGS light sensor at plot 512, which is from a sensor located behind the AGS, according to the present disclosure. It will be appreciated that a sensor located behind the AGS may be located between the active grille shutters and the engine, under the vehicle hood, and on a side of the grille shutters that is facing away from the front of the vehicle. Map 500 further includes a degradation flag at plot 514, and a cooling fan operational mode at plot 516. All plots are depicted over time along the x-axis. In addition, the magnitude of a parameter represented in any given plot increases along the y-axis going from bottom to top, as shown. Time markers t1-t5 depict times where significant events occur.

Prior to time t1, there is a gradual increase of engine speed (plot 504), vehicle speed (plot 506) and engine coolant temperature (plot 502), as may occur when there is an increasing torque demand from an operator. Dashed line 503 represents an engine coolant temperature threshold for opening the AGS, above which, the percentage opening of active grille shutters may be commanded to increase and/or fully open in order to facilitate increased engine cooling by allowing an increased amount of fresh air to enter through the grille of the vehicle. Fresh air intake may be further increased when the vehicle is propelled forward. Dashed line 507 represents a vehicle speed threshold for closing the AGS, above which, the opening of active grille shutters may be commanded to decrease and/or fully close in order to reduce intake of fresh air through the grille and decrease drag, thereby increasing fuel economy. Prior to time t1, the grille shutters remain closed, as the ECT has not yet met the opening threshold temperature 503. The ambient light indication (plot 510) prior to time t1 begins low and gradually increases, as may be indicative of traveling during early morning hours as the sun is rising (e.g., ambient light levels increase toward daytime hours). Prior to time t1, the light indication from the AGS light sensor remains low (e.g., minimal) because the AGS are closed, preventing the low levels of ambient light from entering through the grille shutter openings and reaching the light sensor. No degradation flag is indicated and the cooling fan remains off prior to time t5.

At time t1, responsive to the engine coolant temperature reaching threshold 503, the controller may send a signal to the actuator of the AGS in order to power on the AGS motor and actuate a mechanical linkage to increase the opening of one or more group of active grille shutters (plot 508). Between t1 and t2, responsive to increasing the opening of the active grille shutters, the light indication at the AGS sensor increases (plot 512) and the engine coolant temperature does not continue to increase (plot 502) due to the increased airflow. Vehicle speed continues to increase through time t2, at which time the vehicle speed reaches and exceeds the threshold 507. Responsive to the vehicle speed exceeding threshold 507, the controller may send a signal to the actuator of the active grille shutters in order to power on the AGS motor and actuate a mechanical linkage in order to decrease the opening of the active grille shutters (plot 508). In one example shown, the active grille shutters are moved to a fully closed position at time t2, and the light indication from the AGS sensor correspondingly decreases (plot 512). The engine speed and vehicle speed continue to increase slightly before leveling off between time t2 and t3. The engine coolant temperature remains approximately steady between time t2 and t5.

At t2, the ambient light condition (plot 510) has reached an ambient light threshold 511, above which, the AGS diagnostic may be initiated. It will be appreciated that the ambient light threshold may be any suitable value of ambient light and comprise one or more of sunlight, moon light, overcast conditions, artificial lights from a parking lot during night time hours, and a reflection of the vehicle headlights from a wall forward of the vehicle. For illustrative purposes, sometime between t2 and t3, the AGS become stuck in a closed position.

The AGS diagnostic is intiated at time t3, and responsive to initiating the diagnostic, the AGS are commanded to a fully open position (dashed plot 509) but the grille shutters are unable to assume the fully opened position and remained closed (plot 508). As a result, the light indication from the AGS light sensor does not increase as expected. Specifically, with the AGS fully open, the AGS light sensor indication (plot 513) would have been within a threshold of the ambient light indication (plot 510). Rather, the light indication from the AGS light sensor remains consistent with a closed AGS (plot 512). At time t4, the AGS diagnostic includes commanding the AGS to a fully closed position. Because in the depicted example the AGS are stuck closed, there is no change in AGS position (plot 508) or light indication at the AGS light sensor (plot 512). The ambient light indication remains relatively constant for the duration of the AGS diagnostic.

At time t5, the AGS diagnostic ends, and responsive to the difference between the expected light indication from AGS sensor and the ambient light indication between t3 and t4, an indication of AGS degradation is flagged at time t5 (plot 514). Additionally or optionally, if the output from the first light sensor (e.g., light indication from AGS sensor) did not change by more than a threshold value when the AGS is commanded from an open to a closed position, AGS degradation may also be indicated and flagged. As previously mentioned, indicating AGS degradation may include setting a diagnostic code and/or illuminating a malfunction indicator light (MIL) on an operator display in the passenger compartment of the vehicle. After time t5, the engine speed (plot 504) and vehicle speed (plot 506) may decrease gradually, as may occur when a vehicle operator decreases activation of an accelerator pedal, decreasing torque demand. When the vehicle speed (plot 506) drops below vehicle speed threshold 507 and/or when engine coolant temperature increases above ECT threshold 503, the controller may send a signal to the actuator of the AGS in order to increase the opening of the AGS. As a result of the degradation indication at time t5 because the AGS are stuck closed, the AGS may be unable to open as desired. As a result, the cooling fan may be actuated (e.g., activated) to increase the moving air across the radiator, heater core and/or CAC (e.g., radiator 80, heater core 90, and/or CAC 18 of FIG. 1) in order to increase the cooling effect on the engine. It will be appreciated that other engine parameters could be controlled responsive to the indication of degradation, including one or more of increasing an engine cooling capacity by activating one or more of an engine fan and a water pump, and decreasing an engine load by decreasing one or more of an HVAC system load and a vehicle auxiliary load. In this way, by utilizing a light sensor behind the AGS to diagnose a position of the active grille shutters, degradation modes of the AGS may be identified and distinguished. These degradation modes may include, but are not limited to, mechanical degradation of the AGS system, which may include a degradation of the AGS motor, stuck or broken grille shutters, or degradation of mechanical linkages between the AGS motor and grille shutters. Additional degradation modes that may be identified include a degraded AGS position sensor, if the AGS system is so equipped. The technical effect of using a light sensor to indicate degradation of the AGS system is that partial AGS degradation, where the AGS may still be able to be adjusted to a limited capacity, may be inferred. As a result, operation of the AGS may be continued, albeit in limited capacity, such that the fuel consumption reduction advantages may be preserved to the greatest extent possible. Further still, inferring the AGS position via a light sensor is more reliable over monitoring ambient temperatures and engine temperature changes with respect to an inferred AGS position, as engine temperature may not respond immediately to AGS position changes, and engine temperature may vary for numerous reasons. Thus, diagnosing a position of the AGS using an output of a light sensor positioned behind the AGS, within an underhood area of the vehicle, may allow for more accurate diagnosis of the AGS and also additional sensors of the AGS system, including a position or temperature.

A method includes, in response to an output of a first light sensor positioned underneath a hood of a vehicle, behind active grille shutters (AGS), diagnosing a position of the AGS; and in response to the diagnosed position, adjusting an engine operating parameter. In a first example of the method, the method further includes the diagnosing is initiated in response to one or more of a threshold duration since the previous diagnostic, a vehicle speed above a threshold speed, and an ambient light condition of ambient light external to the vehicle being above a threshold level. A second example of the method optionally includes the first example and further includes wherein the ambient light condition above the threshold level is indicated by one or more of an output of a second light sensor located external to underneath the hood of the vehicle, a real-time weather report received at a controller of the vehicle, and a real-time onboard clock indicating a day time.

A third example of the method optionally includes one or more of the first and second examples, and further includes wherein diagnosing the position of the AGS includes determining that the AGS are stuck in a closed position in response to the output of the first light sensor being below a threshold level following the AGS being commanded to an open position. A fourth example of the method optionally includes one or more of the first through third examples, and further includes wherein diagnosing the position of the AGS includes determining that the AGS are stuck in an open position in response to the output of the first light sensor being above a threshold level following the AGS being commanded to a closed position. A fifth example of the method optionally includes one or more of the first through fourth examples, and further includes, wherein adjusting the engine parameter includes one or more of adjusting one of more of an engine fan, a water pump, an HVAC system, an engine load, and a vehicle auxiliary load.

Another method includes, in response to an indication of ambient light external to a vehicle being over a threshold level, adjusting active grille shutters (AGS) of the vehicle into each of an open position and a closed position and indicating degradation of the AGS in response to a light condition behind the AGS being outside of a threshold range. The adjusting active grille shutters (AGS) of the vehicle into each of an open position and a closed position may be performed sequentially, including in a first condition, adjusting the AGS open and then closed. Alternatively, the sequential adjustment may include, in a second condition different than the first condition, adjusting the AGS closed and then open. In a first example of the method, the method further includes adjusting an engine operating parameter in response to the indicating degradation. A second example of the method optionally includes the first example and further includes, wherein adjusting the engine operating parameter includes adjusting one of more of adjusting an engine fan, a water pump, an HVAC system, an engine load, and a vehicle auxiliary load. A third example of the method optionally includes one or more of the first and second examples, and further includes, wherein the light condition behind the AGS is measured via a light sensor positioned behind the AGS, within an underhood area of the vehicle. A fourth example of the method optionally includes one or more of the first through third examples, and further includes, in response to the light condition behind the AGS being outside the threshold range, indicating that the AGS are in a position different than commanded and in response to a position sensor of the AGS indicating the AGS are in the commanded position, indicating degradation of the position sensor. A fifth example of the method optionally includes one or more of the first through fourth examples, and further includes, wherein the light condition includes a first measured light condition that is output by the light sensor when the AGS are commanded to the open position and a second measured light condition that is output by the light sensor when the AGS are commanded to the closed position and wherein the light condition being outside of the threshold range includes the first measured light condition being less than a threshold away from the second measured light condition. A sixth example of the method optionally includes one or more of the first through fifth examples, and further includes, wherein the light condition behind the AGS includes a light condition that occurs when the AGS are commanded to the open position and wherein the light condition being outside the threshold range includes the light condition being at a level that is a threshold amount different than a level of the indication of ambient light. A seventh example of the method optionally includes one or more of the first through sixth examples, and further includes, responsive to the indicating degradation, moving the AGS to a default position and disabling a further adjustment of the AGS responsive to an engine operating condition.

A system for a vehicle includes active grille shutters (AGS) positioned at a front end of the vehicle; a first light sensor positioned within the vehicle, behind and proximate to the AGS; and a controller including non-transitory instructions stored in memory for: while commanding the AGS into an open and then a closed position, monitoring an output of the first light sensor; diagnosing a position of the AGS in response to the monitored output of the first light sensor relative to a threshold; and adjusting an engine operating parameter in response to the diagnosed position. In a first example of the method, the method further includes a second light sensor located proximate to one or more of a rear-view mirror, a vehicle dashboard, and a vehicle headlight and wherein the threshold includes one or more of a first threshold difference between the output of the first light sensor while the AGS is in the open position and the output of the first light sensor while the AGS is in the closed position, and a second threshold difference between the output of the first light sensor and the second light sensor while the AGS is commanded into the open position. A second example of the method optionally includes the first example and further includes, wherein the instructions further include instructions for determining the AGS are in a stuck closed position in response to a difference between the output of the first light sensor while the AGS is commanded into the open position and the output of the first light sensor while the AGS is commanded into the closed position being less than the first threshold difference and a difference between the output of the first light sensor and the second light sensor while the AGS is commanded into the open position being greater than the second threshold difference. A third example of the method optionally includes one or more of the first and second examples, and further includes, wherein the instructions further include instructions for determining the AGS are in a stuck open position in response to a difference between the output of the first light sensor while the AGS is commanded into the open position and the output of the first light sensor while the AGS is commanded into the closed position being less than the threshold difference and a difference between the output of the first light sensor and the second light sensor while the AGS is commanded into the open position being less than the threshold difference. A fourth example of the method optionally includes one or more of the first through third examples, and further includes, wherein adjusting the engine operating parameter includes one or more of increasing an engine cooling capacity by activating one or more of an engine fan and a water pump, and decreasing an engine load by decreasing one or more of an HVAC system load and a vehicle auxiliary load. A fifth example of the method optionally includes one or more of the first through fourth examples, and further includes a position sensor for indicating a position of the AGS and wherein the instructions further include instructions for indicating degradation of the position sensor in response to determining that the AGS are in a position different than a commanded position based on the monitored output of the light sensor and an output of the position sensor indicating the AGS are in the commanded position.

In another representation, a method includes, in response to a request to initiate a diagnostic of active grille shutters (AGS) positioned at a front end of a vehicle, adjusting the AGS between and open and closed position, and during a first condition, indicating degradation of the AGS in response to an output of a light sensor positioned behind the AGS not changing by a threshold amount when adjusting the AGS between the open and closed positions; and during a second condition, not indicating degradation of the AGS and continuing to adjust the AGS based on engine operating conditions in response to the output changing by at least the threshold amount when adjusting the AGS between the open and closed positions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising:
    while propelling a vehicle via an engine,
        in response to an output of a first light sensor positioned underneath a hood of a vehicle, behind active grille shutters (AGS), relative to ambient light sensed by a second light sensor, diagnosing a position of the AGS; and in response to the diagnosed position relative to a commanded position of the AGS, adjusting an engine operating parameter.

2. The method of claim 1, wherein the diagnosing is initiated in response to one or more of a threshold duration since a previous diagnostic, a vehicle speed above a threshold speed, and an ambient light condition of ambient light external to the vehicle being above a threshold level.

3. The method of claim 2, wherein the ambient light condition above the threshold level is indicated by one or more of an output of the second light sensor located external to underneath the hood of the vehicle, a real-time weather report received at a controller of the vehicle, and a real-time onboard clock indicating a day time.

4. The method of claim 3, wherein the second light sensor is located proximate to one or more of a rear-view mirror, a vehicle dashboard, and a vehicle headlight.

5. The method of claim 4, wherein the threshold level includes one or more of a first threshold difference between the output of the first light sensor while the AGS is in an open position and the output of the first light sensor while the AGS is in a closed position, and a second threshold difference between the output of the first light sensor and the output of the second light sensor while the AGS is in the open position.

6. The method of claim 2, further comprising adjusting the AGS of the vehicle into each of an open position and a closed position sequentially and indicating degradation of the AGS in response to the ambient light condition behind the AGS being outside of the threshold level.

7. The method of claim 6, further comprising, responsive to the indicating degradation, moving the AGS to a default position and disabling a further adjustment of the AGS responsive to an engine operating condition.

8. The method of claim 1, wherein diagnosing the position of the AGS includes determining that the AGS are stuck in a closed position in response to the output of the first light sensor being below a threshold level following the AGS being commanded to an open position, the threshold level determined as a function of the sensed ambient light.

9. The method of claim 1, wherein diagnosing the position of the AGS includes determining that the AGS are stuck in an open position in response to the output of the first light sensor being above a threshold level following the AGS being commanded to a closed position, the threshold level determined as a function of the sensed ambient light.

10. The method of claim 1, wherein adjusting the engine operating parameter further includes one or more of adjusting one or more of an engine fan, a water pump, an HVAC system, an engine load, and a vehicle auxiliary load.

11. The method of claim 10, wherein adjusting the engine operating parameter includes one or more of increasing an engine cooling capacity by activating one or more of the engine fan and the water pump, and decreasing the engine load by decreasing one or more of an HVAC system load and the vehicle auxiliary load.

12. A method, comprising:
in response to an indication of ambient light external to a vehicle being over a threshold level,
adjusting active grille shutters (AGS) of the vehicle into each of an open position and a closed position sequentially and indicating degradation of the AGS in response to a light condition behind the AGS being outside of a threshold range; and
responsive to the degradation, moving the AGS to a default position and disabling further adjustment of the AGS responsive to an engine operating condition.

13. The method of claim 12, further comprising adjusting an engine operating parameter in response to the indicating degradation.

14. The method of claim 13, wherein adjusting the engine operating parameter includes adjusting one or more of an engine fan, a water pump, an HVAC system, an engine load, and a vehicle auxiliary load.

15. The method of claim 12, wherein the light condition behind the AGS is measured via a light sensor positioned behind the AGS, within an underhood area of the vehicle.

16. The method of claim 15, further comprising, in response to the light condition behind the AGS being outside the threshold range, indicating that the AGS are in a position different than commanded and in response to a position sensor of the AGS indicating the AGS are in the commanded position, indicating degradation of the position sensor.

17. The method of claim 15, wherein the light condition includes a first measured light condition that is output by the light sensor when the AGS are commanded to the open position and a second measured light condition that is output by the light sensor when the AGS are commanded to the closed position and wherein the light condition being outside of the threshold range includes the first measured light condition being less than a threshold away from the second measured light condition.

18. The method of claim 12, wherein the light condition behind the AGS includes a light condition that occurs when the AGS are commanded to the open position and wherein the light condition being outside the threshold range includes the light condition being at a level that is a threshold amount different than a level of the indication of ambient light.

19. The method of claim 12, wherein the ambient light condition being over the threshold level is indicated by one or more of an output of a second light sensor located external to underneath a hood of the vehicle, a real-time weather report received at a controller of the vehicle, and a real-time onboard clock indicating a day time.

* * * * *